(No Model.)
W. S. BOLIVER.
STALK CUTTER.
No. 250,050. Patented Nov. 29, 1881.
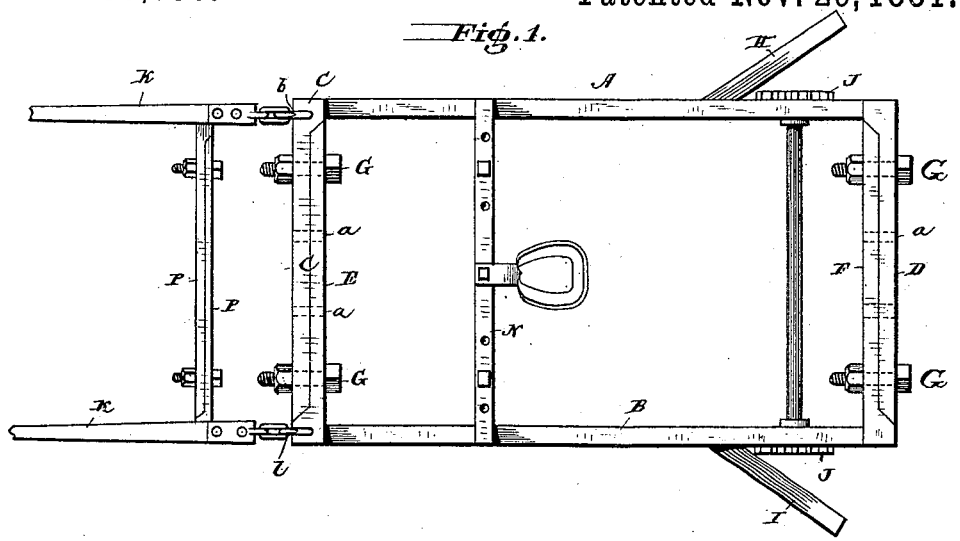
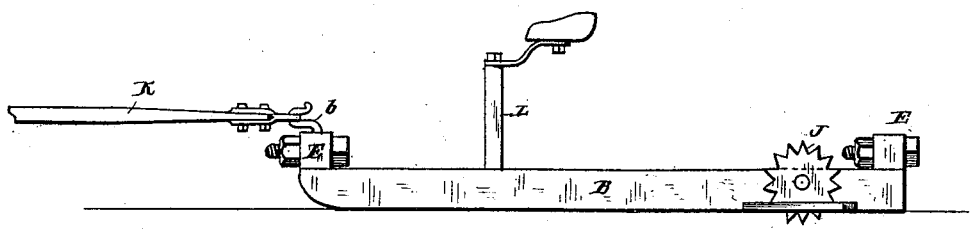
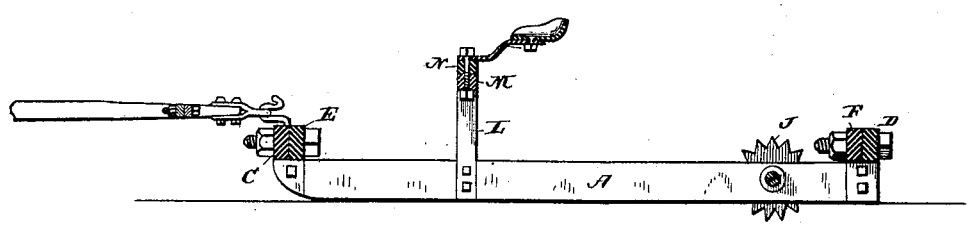
Witnesses:
A. M. Long
A. M. Tanner
Inventor.
Wm. S. Boliver
by Paine Grafton & Ladd
Attorneys.

UNITED STATES PATENT OFFICE.

WILLIAM S. BOLIVER, OF HONEY GROVE, TEXAS.

STALK-CUTTER.

SPECIFICATION forming part of Letters Patent No. 250,050, dated November 29, 1881.

Application filed July 8, 1881. (No model.)

*To all whom it may concern:*

Be it known that I, WILLIAM S. BOLIVER, a citizen of the United States, residing at Honey Grove, in the county of Fannin and State of Texas, have invented certain new and useful Improvements in Stalk-Cutters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of machines for cutting cotton and other stalks, consisting, essentially, of parallel runners or beams carrying outwardly-projecting knives, which serve to cut the stalks as the machine is drawn over the ground.

The invention consists in the construction and combination of parts, which will hereinafter be more fully described, and then set forth in the claim.

In the drawings, Figure 1 is a top view of a stalk-cutter constructed according to my invention. Fig. 2 is a side elevation thereof; and Fig. 3 is a longitudinal section, showing more fully the adjustable runners and seat-support.

The letters A and B designate a pair of parallel runners or longitudinal beams adapted to slide upon the ground. The runner A is provided with front and rear cross-bars, C D, which overlap or extend alongside similar cross-bars, E and F, of the runner B. These cross-bars are cut or so shaped that they will fit close together and enable fastening or retaining bolts G to be passed through the overlapping bars. A series of holes, a, made in said bars, will permit the bolt to be shifted from one hole into the other, so as to enable the runners to be spread apart or brought closer together. Grooves made in the bottom faces of the runners serve as seats for outwardly-projecting knives or blades H I, which are bolted or otherwise secured to the runners. These knives extend from the runners in a rearward direction at an angle of about forty-five degrees, and their function is to cut or clip off the stalks close to the surface of the ground as the machine is drawn over the latter. The oblique position of the cutters will tend to produce a draw-cut upon the stalks, so as to facilitate the cutting off of the same.

A serrated or toothed wheel, J, turning loosely on a gudgeon or spindle projecting from each runner in rear of the cutters, prevents the machine from sliding to one side when either blade encounters a stalk and there is none on the other side. The serrated or toothed wheels J turn by frictional contact with the ground, and their teeth project only a short distance below the runners, so as not to retard the progress of the machine by a too deep penetration of the wheels into the ground.

It will be obvious that when either cutter passes on an open space, or does not meet a stalk when the opposite cutter is performing its cutting operation, the serrated wheel will act as a point of resistance and prevent the machine from being thrown out of a straight line.

The draft is applied to the machine through the medium of the shafts K, which have adjustable cross-bars P, and eyes or links at their rear ends fitting on hooks $b$ on the front cross-bars of the runner-frame.

Standards L, rising from the runners near the front ends thereof, serve to support a two-part or sectional cross-bar, M, which is adjustably connected with a cross-bar, N, in the same manner as the cross-bars of the runners.

A suitable driver's seat is secured to the cross-bar N in any approved manner.

A machine constructed as above described is designed to cut two rows of stalks at the same time, and as provision is made for adjusting the frame laterally, the machine can readily be made to suit rows of varying widths.

I disclaim the broad idea of constructing a field stalk-cutter of parallel runners carrying oblique cutters; neither do I propose to claim a laterally-adjustable frame having plows or other agricultural implements fitted therein.

Having thus described my invention, what I claim as new, and desire to secure by Letters Patent, is—

In a stalk-cutter, the combination of the parallel runners A B, adjustable front and rear connecting-bars, C E D F, outwardly-projecting knives H I, and serrated wheels J J with suitable draft-thills and seat-supporting bar, as and for the purpose set forth.

In testimony whereof I affix my signature in presence of two witnesses.

WILLIAM S. BOLIVER.

Witnesses:
A. N. KINSWORTHY,
W. N. ALLEN.